United States Patent Office 3,097,220
Patented July 9, 1963

3,097,220
METHOD OF PRODUCING HIGHER FATTY ACID POLYMERS
Fred O. Barrett and Charles G. Goebel, Cincinnati, Ohio, assignors to Emery Industries, Inc., Cincinnati, Ohio, a corporation of Ohio
No Drawing. Filed May 22, 1962, Ser. No. 196,584
4 Claims. (Cl. 260—407)

This invention relates to a method of producing polymers from unsaturated fatty acids of the type obtainable from various vegetable oils, tall oils and animal fats. It is particularly directed to a method for converting said acids, which are predominantly of the $C_{18}$ variety, into polymer mixtures containing a relatively large proportion of trimer, the latter term indicating a polymer molecule containing three fatty acid molecules and a corresponding number of free carboxyl groups. Products of this character are in contrast to those now commercially available which contain relatively little trimer and are made up in large proportion of dimer materials formed by the union of two fatty acid molecules. This application is a continuation-in-part of our copending application, Serial No. 86,593, filed February 2, 1961.

Fatty acid polymers find use in a wide variety of industrial applications. Their value lies largely in the presence of the carboxyl groups which undergo various esterification, amidation, saponification and other reactions characteristic of the group to form a wide variety of products useful as resins or as resin components.

A particularly important application is in the field of epoxy resins, the fatty acid polymers reacting with the epoxy group of the resin to form an ester linkage, thus imparting flexibility to the resulting product while simultaneously curing the resin. When fatty acid polymers rich in dimer components are reacted with epoxy compounds or with various difunctional materials such as glycols or diamines, the products obtained are essentially linear in character. These products tend to have good elastic qualities but are low in tensile strength. On the other hand, when polymers rich in trimer are similarly reacted there are obtained three dimensional products which have relatively high tensile strength and a satisfactory degree of elasticity. Moreover, these products have better solvent and heat resistivity than the linear type of polymer. It should also be noted that the strength factor of the three dimensional product is such as to permit the use of asphalts and other extenders without adversely affecting product quality.

Various methods of polymerizing fatty acids are known. One such method is described in U.S. Patents Numbers 2,793,219 and 2,793,220 and involves heating the acid starting material in the presence of water and a crystalline clay mineral. This method, however, is productive largely of dimer and of but from 15 to 30% of trimer, the lower portion of this range characterizing products formed from monounsaturated acids such as oleic acid, with polyunsaturated acids tending to form larger proportions of the trimer component. While the overall polymer product of the clay method is not capable of being used to form a satisfactory three-dimensional system, it is possible to recover a component fraction therefrom which is rich in trimer by subjecting the product to a highly efficient distillation method such as that of the so-called molecular type. However, the separation costs so entailed are so high as to make the process impractical from a commercial standpoint.

It is also known that unsaturated fatty acids can be polymerized by heating them in the presence of a Friedel-Crafts catalyst, e.g., boron trifluoride and its various complexes, zinc chloride, phosphotungstic acid, aluminum chloride and the like. While this product is high in trimer, its acid number is considerably lower than that of the acid starting material. In other words, the product has impaired functionality and thus cannot be efficiently used for most applications. Perhaps because of low functionality or by reason of the presence of by-product compounds in the product, the epoxy and other resins formed with the aid of the polymer material have relatively poor tensile strength along with other inferior product qualities. Thus, in some reactions the polymer tends to release monomeric acids which act as chain stoppers or otherwise weakness to the resin.

It is an object of this invention to provide a polymer composition derived from unsaturated fatty acid starting materials which is relatively high in trimer content, has good functionality and is free of readily decomposable components. A more particular object of the invention is to provide a process whereby a polymer product of this character can be obtained from the reaction product obtained by polymerizing unsaturated fatty acids in the presence of a Friedel-Crafts catalyst. Another object is to provide a high-trimer polymer of the foregoing character which is well adapted to be used in conjunction with epoxy and other resin-forming compositions to form products of relatively high tensile strength, good elasticity and good over-all resistivity against attacks by heat, solvents or other chemicals. The nature of still other objects of the invention will be apparent from a consideration of the descriptive portion to follow.

The present invention is based on the discovery that the foregoing objects can be obtained by first polymerizing an unsaturated fatty acid material in known fashion in the presence of a Friedel-Crafts catalyst, and thereafter heating the resulting reaction product in the presence of water and a minor percentage of a crystalline clay mineral at temperatures of from about 180 to 260° C. for at least ½ hour. The resulting product, after being freed of clay mineral and monomeric acid, is found to be relatively rich in trimer or higher polymer components and to have an acid number which is substantially higher than that of a similar product formed as a result of the Friedel-Crafts treatment alone. Moreover, the product is one which is stable and highly resistant to decomposition to monomer when combined with various epoxy resins, glycols, polyamines or other compounds.

According to the invention, an unsaturated fatty acid material, preferably recovered from tall oil or derived from a glyceride oil such as safflower, soybean, corn, sunflower seed, peanut, linseed or tung oil or from an animal fat or oil, and selected from the group consisting of longchain, unsaturated, aliphatic carboxylic acids such as oleic acid, linoleic acid, linolenic acid, eleostearic acid and the like, or mixtures thereof, is first subjected to the action of a Friedel-Crafts catalyst in catalytic amount at elevated temperatures and for a period of time sufficient to induce the desired polymerization of the fatty acid material. In general, good results are obtained by the use of from about 0.5 to 5% of such catalysts as boron trifluoride, boron trifluoride-phosphoric acid complex, phosphotungstic acid, silicotungstic acid, fluorboric acid and zinc fluorborate, with somewhat larger amounts being used with chlorides of aluminum, tin, iron and zinc. An operable temperature range is from about 100 to 250° C., with heating being continued for a period of time which, dependent on temperature and catalyst kind and concentration, usually ranges from ½ to 10 hours.

The reaction product of the foregoing step can be heated with clay mineral without further preparatory treatment, if desired, it having been found that the added clay material appears to inactivate the residual Friedel-Crafts catalyst by an absorption or neutralization action not fully understood. On the other hand, this reaction product may be water washed or neutralized with alkali (e.g., NaOH or Ca(OH)₂) to remove the contained Friedel-Crafts catalyst. When neutralization results in formation of insoluble salts, the latter are preferably removed before the ensuing treating step is instituted.

The polymer product formed in the presence of the Friedel-Crafts catalyst is next heated at temperatures of from about 180 to 260° C. for a period of at least ½ hour in the presence of water and a crystalline clay mineral. In carrying out this step, a suitable reaction vessel is changed with the acids to be polymerized, a clay mineral and water, the water being present as a component of the clay in some instances. The vessel is then heated to polymerization temperatures, preferably under elevated pressure to retain in the reaction mixture, at least a portion of the water present in the system.

The clay minerals which may be used in the practice of the process of this invention are the commercially abundant, crystalline, surface active clay minerals such as montmorillonite, hectorite, halloysite, attapulgite and sepiolite. The commercial montmorillonite-rich bentonites may also be used. In general, clay minerals of the montmorillonite type constitute a preferred class for use in the present invention. The amount of clay mineral employed in the reaction mixture may range from about 1 to 20% of the weight of the fatty acids, though from a practical operating standpoint, a preferred range is from 2 to 6%.

The amount of water incorporated in the reaction mixture usually ranges from about 0.5 to 5% in terms of the weight of fatty acids present, though good results may be obtained with somewhat lesser amounts, particularly if the free space in the vessel is kept to a minimum. In some cases the water content of the clay itself may be sufficient to promote the reaction. As a conventional practice, water is maintained in the reaction mixture as the same is brought to operating temperatures and maintained thereat, by closing the vessel and allowing steam pressure to build up as described in the examples given below. However, other appropriate means, as a reflux condenser or the like, may be employed to maintain the water content of the reaction mixture at an operable level.

If desired, the clay mineral-catalyzed reaction step may also be conducted in the presence of a small amount of an alkali material (e.g., alkali metal or alkaline earth metal oxides, hydroxides or carbonates), the alkali being added either as a separate component, as a component of the clay (certain alkaline clays containing available alkali), or in the form of a fatty acid soap. This feature of the invention is described in U.S. Patent No. 2,955,121. The amount of alkali employed may vary over a relatively wide range of from extremely small amounts (of the order of 0.1% or even less in terms of the weight of clay mineral present) to those as large as 10 or 20%.

The step of treating in the presence of clay mineral may be performed at temperatures ranging from about 180 to 260° C. A practical and preferred temperature range is from about 220 to 250° C. A satisfactory degree of product improvement occurs within a reaction period of from about 2 to 6 hours under these preferred temperature conditions, the recommended practice being to continue the heating until the acid number of the product reaches a relatively high and stable level. In general, the use of relatively low reaction temperatures necessitates use of correspondingly longer reaction times, and vice versa. However, the use of unduly high temperatures, while permitting of shorter reaction times, is to be avoided insofar as possible since it may lead to degradation of product.

Once the reaction has been completed, the charge is cooled and (in runs operated at elevated pressures) the pressure is released to permit flashing of the water. The system may then be acidulated with phosphoric, sulphuric, oxalic or other acid adapted to convert any soap present therein to free acid and a substantially fatty acid-insoluble soap. Whether or not the acidulation step is practiced, the product is preferably filtered or otherwise treated to remove the clay mineral and any other solid materials present. The filtrate is then subjected to a conventional vacuum distillation to remove the non-polymerized portion as a distillate, leaving the desired trimer-rich polymer as the residue.

The following examples are illustrative of the invention in various of its embodiments.

EXAMPLE I

In this operation, oleic acid having an acid number of 201 was admixed with 1% of BF₃ and heated for 4 hours at 160° C. The resulting product was cooled and water-washed to remove BF₃. One portion of the washed material was then distilled in vacuo at 270° C. to remove non-polymerized monomer, leaving a trimer-rich polymer residue of 33.4%. The balance was heated in an autoclave along with 4% of grade 20 Filtrol, a product of the Filtrol Corporation consisting of an acid-activated montmorillonite clay. In the latter step, the material in the autoclave was heated at 230° C. for 4 hours under a steam pressure of 100 p.s.i.g. The autoclave was then cooled and the water flashed off by releasing the pressure. The product was filtered to remove the clay, after which the monomer was removed by heating the filtrate at 270° C. (1 mm. Hg abs.). The trimer-rich product recovered from the BF₃ catalyzed reaction product had an acid number of 97.8, while that recovered from the combined BF₃-clay treatment (in a yield of 49.9%) had an acid number of 184. Both products had a trimer content of about 25–30%, this in contrast to a trimer level of about 15–17% in the case of product produced from oleic acid by the use of clay mineral and water without a preliminary BF₃ treatment.

EXAMPLE II

In this operation, the method followed was that described in Example I. Here, however, the feedstock represented a 50–50 blend of fatty acids recovered from soy and linseed oils, the stock having an acid number of 193. Further, the initial polymerization was affected in the presence of 0.8% BF₃, while the clay used in the succeeding step was a natural rather than an acid-activated montmorillonite clay mineral. In this case, the acid number of the polymer obtained following only BF₃ treatment (in a yield of 63.7%) was 130, while that produced by the combined BF₃-clay treatment (in a yield of 59.6%) was 186.5. Both products contained from about 50–60% of trimer and higher polymers.

EXAMPLE III

The method of Example II was repeated except that here the step of heating in the presence of clay mineral was effected at atmospheric pressures, the vessel being provided with a condenser which returned water to the system as it was distilled therefore. The water present in the vessel was that originally contained in the clay, the latter having a moisture content of about 15%. The acid number of the polymer recovered in a yield of 53.6% following the clay treatment was 170.

EXAMPLE IV

Two series of runs were made to evaluate the properties of epon resins formed by reaction, in stoichiometric proportions, of an epoxy compound with the polymers produced in accordance with the method of Example II. In series 1, the polymer was reacted with the epoxy compound (diglycidyl ether of bisphenol A) in the presence of dimethyl benzylamine as a catalyst, while in series 2 a bituminous extender was also incorporated in the mixture and the catalyst was omitted. In each series, the polymer obtained from BF₃ treatment alone was used in one case, while that obtained from the combined BF₃-clay treatment was used in the other. In forming the resin, the mixture was slowly heated to 100° C. and then rapidly brought to 110–120° C. It was then held at this temperature for 1–3 minutes before being poured into a mold where it was allowed to cure at 125° C. for 4 hours. Samples were cut from the cured product and subjected to standard test methods to determine modulus and tensile strength, as well as elongation at 70° F. The results obtained are expressed in the following table:

Table

|  | Parts | Modulus, p.s.i. | Tensile, p.s.i. | Elonation, percent |
|---|---|---|---|---|
| Series 1: | | | | |
| BF₃ polymer | 69 | 76 | 130 | 160 |
| Epoxy compound | 31 | | | |
| Catalyst | 0.5 | | | |
| BF₃-clay polymer | 61.1 | 400 | 1,500 | 220 |
| Epoxy compound | 38.9 | | | |
| Catalyst | 0.5 | | | |
| Series 2: | | | | |
| BF₃ polymer | 25.6 | 27 | 107 | 260 |
| Epoxy compound | 12.0 | | | |
| Extender | 62.5 | | | |
| BF₃-clay polymer | 22.6 | 326 | 700 | 270 |
| Epoxy compound | 15.0 | | | |
| Extender | 62.5 | | | |

EXAMPLE V

A mixture of fatty acids having the composition oleic 24%, linoleic 61%, linolenic 8% and various saturated acids 7%, was reacted with 2% $BF_3 \cdot H_3PO_4$ complex at 160° C. for 4 hours. One portion of the resulting product was water-washed and freed of monomer by distillation at 270° C. (1 mm. Hg abs.), the indicated yield of polymer here being 62.6%. The remainder of the product, following water-washing, was heated in an autoclave at 230° C. for 4 hours in the presence of grade 20 Filtrol under a steam pressure of 100–150 p.s.i.g. The product so obtained was cooled, filtered and vacuum-distilled under the same conditions as the $BF_3 \cdot H_3PO_4$ product to eliminate monomer components. The remaining polymer product (obtained in a yield of 67.4%) contained about 50–55% of trimer and higher polymers and had an acid number of 190. This compared with an acid number of 155 for the product of only the $BF_3 \cdot H_3PO_4$ treatment, and to a value of 200 for the starting fatty acid mixture. It should also be noted that the $BF_3 \cdot H_3PO_4$ polymer product had a Gardner color of 14.5 while that obtained from the clay-treated product had a color of 8.

EXAMPLE VI

The process described in Example 5 was repeated, but with 1% of phosphotungstic acid instead of $BF_3 \cdot H_3PO_4$. Here the polymer product obtained prior to clay treatment in a yield of 57.5% had an acid number of 172 and a Gardner color of 12, while the product obtained following the added clay treating step in a yield of 66.4% had an acid number of 187 and a Gardner color of 9.5 Trimer content of the products was about 50–55%.

EXAMPLE VII

Here again the process of Example V was repeated, but with 2% of silicotungstic acid instead of $BF_3 \cdot H_3PO_4$. The yield from the first stage was 61.6% of a polymer material having an acid number of 167 and a Gardner color of 13, while the polymer from the second, or clay stage, obtained in 65.4% yield, had an acid number of 189 and a Gardner color of 10. The product contained 55% of trimer.

EXAMPLE VIII

Liquid acids, recovered by solvent separation methods from mixed soybean fatty acids, were reacted in the presence of 2% by weight of phosphotungstic acid at 180° C. for 4 hours. The resulting reaction mixture was cooled and to it was added 4% by weight of grade 20 Filtrol and 2% by weight of water. This mixture was then heated in an autoclave for 4 hours at 230° C., with steam pressure in the vessel being adjusted to, and maintained at, about 100–120 p.s.i. The resulting product (after sampling) was then cooled, filtered, and topped to remove monomeric acids by heating the mixture to a temperature of 270° C. at 1 mm. Hg abs. The resulting residue, obtained in a yield of 62.5%, had an acid number of 178. It contained approximately 55% of trimer and higher polymers. On the other hand, the residue recovered in a similar fashion from the sample taken following treatment with phosphotungstic acid but before treatment with Filtrol had an acid number of 158, said residue being obtained in the yield of 56.1%.

Having described our invention, we claim:

1. In a process wherein unsaturated, higher fatty acids are heated in the presence of a Friedel-Crafts catalyst to form a reaction product containing fatty acid polymer, the improvement which consists in increasing the acid number of said polymer by heating said reaction product in the continuing presence of water and a crystalline clay mineral at temperatures of from about 180 to 260° C. for at least ½ hour.

2. The process of claim 1 wherein the clay mineral is one of the montmorillonite type.

3. In a process wherein unsaturated, higher fatty acids are heated in the presence of a Friedel-Crafts catalyst to form a reaction product containing fatty acid polymer, the improvement which consists in increasing the acid number of said polymer by first removing the Friedel-Crafts catalyst from the said reaction product, then heating the latter in the continuing presence of water and a crystalline clay mineral at temperatures of from 180 to 260° C. for at least ½ hour, removing the clay mineral from the resulting reaction product, and recovering the desired polymer therefrom by distilling off the monomer portion under vacuo.

4. In a process wherein unsaturated, higher fatty acids are heated in the presence of $BF_3$ to form a reaction product containing fatty acid polymer, the improvement which consists in increasing the acid number of said polymer by first removing the $BF_3$ from the said reaction product, then heating the latter in the continuing presence of water and a montmorillonite clay mineral at temperatures of from 180 to 260° C. for at least ½ hour, removing the clay mineral from the resulting reaction product, and recovering the desired polymer therefrom by distilling off the monomer portion under vacuo.

No references cited.